UNITED STATES PATENT OFFICE.

HUGO GALLINOWSKY, OF SAN FRANCISCO, CALIFORNIA, ASSIGNOR TO THE PACIFIC COMPOUND STONE COMPANY, OF SAME PLACE.

ARTIFICIAL-STONE COMPOSITION.

SPECIFICATION forming part of Letters Patent No. 500,485, dated June 27, 1893.

Application filed March 30, 1893. Serial No. 468,338. (No specimens.)

*To all whom it may concern:*

Be it known that I, HUGO GALLINOWSKY, a citizen of the United States, residing in the city and county of San Francisco, State of California, have invented an Improvement in Artificial Stones; and I hereby declare the following to be a full, clear, and exact description of the same.

My invention relates to an artificial stone composition.

It consists of certain ingredients united as hereinafter described.

In the preparation of my compound I take natural hydromagnesite, boracic and oxalic acids and the mother liquor of sea water, together with sand or concrete, paraffine oil, tar or rubber, bisulphide of carbon and fiber.

In making the material I first take hydromagnesite finely powdered in about the proportion of one and one-half pounds, and a saturated solution of boracic acid one-eighth of a pound; I take of oxalic acid a sufficient quantity to unite with the proportion of lime which may be contained in the rock to form an oxalate of insoluble oxalate of lime. The proportion of oxalic acid cannot be given exactly, as the amount will vary and depend upon the amount of lime contained in the particular rock which is being employed. To this I add the mother of liquor of sea water or the residue which is drawn off from the vats of natural salt works after the salt has been precipitated. This liquor is used at a degree of concentration equal to about thirty-four degrees. To this I add sand or pulverized concrete and any suitable fiber, which is intimately mixed throughout the mass and serves to form a bond therein. I also add paraffine oil, tar or rubber, with a sufficient amount of bisulphide of carbon to cause the oily substance to intimately unite with the material of the mass, and all is then mixed together and allowed to set in molds, or any desired form. The addition of the oil, tar or rubber gives the mass a quality of toughness, and it is less liable to chip or break at the corners after being set. The reaction which takes place is as follows:

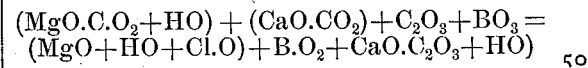

forming magnesia hydrate + oxychloride of magnesia + boron-trioxide + calcium oxalate.

Having thus described my invention, what I claim as new, and desire to secure by Letters Patent, is—

A composition of matter for artificial stone consisting of hydromagnesite, oxalic and boracic acid and the mother liquor of sea water, with sand, fiber and an oleaginous substance, substantially as herein described.

In witness whereof I have hereunto set my hand.

HUGO GALLINOWSKY.

Witnesses:
S. H. NOURSE,
GEO. H. STRONG.